United States Patent
Lisagor et al.

(10) Patent No.: US 11,247,419 B2
(45) Date of Patent: *Feb. 15, 2022

(54) SYSTEM AND METHOD FOR 3D PRINTING ON PERMEABLE MATERIALS

(71) Applicant: 3D Systems, Inc., Rock Hill, SC (US)

(72) Inventors: Jessica Lisagor, Olympic Valley, CA (US); Andrew R Miller, The Woodlands, TX (US); Martin Johnson, Rock Hill, SC (US); Nickalaus Podgursky, Huntersville, NC (US); Leigh Herran, Charlotte, NC (US)

(73) Assignee: 3D Systems, Inc., Rock Hill, SC (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/895,978

(22) Filed: Jun. 8, 2020

(65) Prior Publication Data

US 2020/0298508 A1    Sep. 24, 2020

Related U.S. Application Data

(63) Continuation of application No. 14/980,846, filed on Dec. 28, 2015, now Pat. No. 10,695,992.

(Continued)

(51) Int. Cl.
| | |
|---|---|
| *B29C 70/78* | (2006.01) |
| *B29C 64/245* | (2017.01) |
| *B29C 64/118* | (2017.01) |
| *B29C 64/106* | (2017.01) |
| *B29K 67/00* | (2006.01) |
| *B29K 667/00* | (2006.01) |

(52) U.S. Cl.
CPC ............ *B29C 70/78* (2013.01); *B29C 64/106* (2017.08); *B29C 64/118* (2017.08); *B29C 64/245* (2017.08); *B29K 2067/046* (2013.01); *B29K 2667/046* (2013.01); *B29K 2713/00* (2013.01)

(58) Field of Classification Search
CPC ..... B29C 70/78; B29C 64/245; B29C 64/106; B29K 2667/046; B29K 2713/00; B29K 2067/046
See application file for complete search history.

(56) References Cited

U.S. PATENT DOCUMENTS

| | | | |
|---|---|---|---|
| 2008/0006966 A1* | 1/2008 | Mannella | B29C 64/118 264/259 |
| 2011/0316931 A1* | 12/2011 | Silverbrook | B33Y 10/00 347/40 |

(Continued)

*Primary Examiner* — Michael M. Robinson
(74) *Attorney, Agent, or Firm* — Staniford Tomita LLP

(57) ABSTRACT

Thermoplastic 3D objects are printed directly onto permeable materials with a high strength bond. The 3D object can be attached to the permeable material at one side where the bottom layer of the 3D object can be attached to the permeable material or alternatively, at an internal layer where portions of the 3D object are on opposite sides of the permeable material. In order to improve the adhesion of the 3D object to the permeable material, the bonding layer of the liquid thermoplastic material that is printed directly onto the permeable material can be deposited at modified 3D printer settings that can include a hotter than normal material deposition temperature. Additional build layers of the liquid thermoplastic material are printed on the bonding layer to complete the 3D objects.

20 Claims, 13 Drawing Sheets

Related U.S. Application Data

(60) Provisional application No. 62/210,765, filed on Aug. 27, 2015, provisional application No. 62/098,665, filed on Dec. 31, 2014.

(56) References Cited

U.S. PATENT DOCUMENTS

2013/0310507 A1* 11/2013 Tummala ............... C09J 133/08
 524/503
2015/0321434 A1* 11/2015 Sterman ................. B29C 64/10
 264/255

* cited by examiner

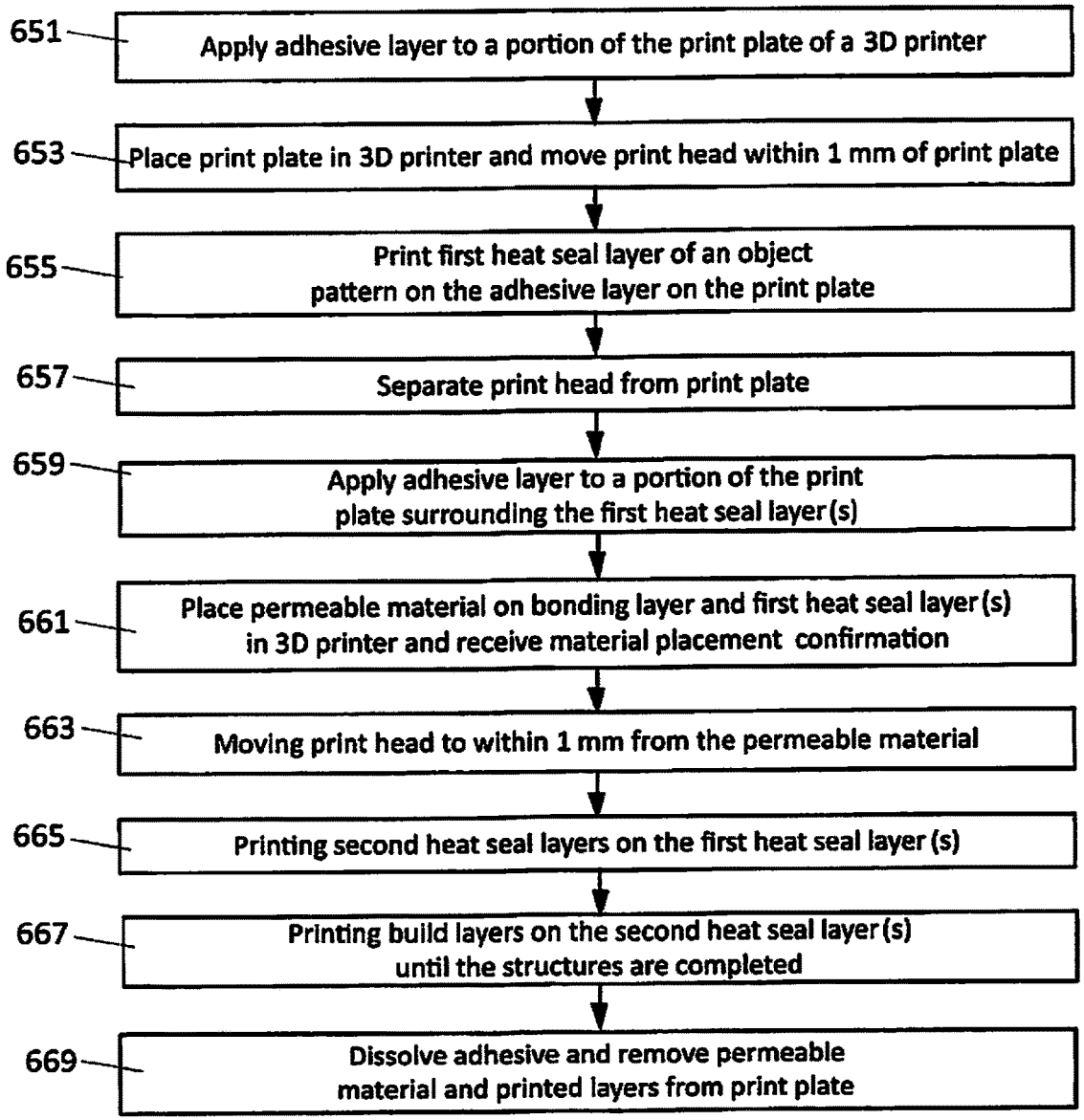

SYSTEM AND METHOD FOR 3D PRINTING ON PERMEABLE MATERIALS

CROSS REFERENCE TO RELATED APPLICATIONS

This application is a continuation of U.S. patent application Ser. No. 14/980,846, "System And Method For 3D Printing On Permeable Materials" filed Dec. 28, 2015, now U.S. Pat. No. 10,695,992 which claims priority to U.S. Provisional Patent Application No. 62/098,665, "System And Method For 3D Printing On Permeable Materials" filed Dec. 31, 2014 and U.S. Provisional Patent Application No. 62/210,765, "System And Method For 3D Printing On Permeable Materials" filed Aug. 27, 2015, which are hereby incorporated by reference in their entireties.

BACKGROUND

Three dimensional (3D) printers and rapid prototyping (RP) systems are currently used primarily to produce objects from 3D computer-aided design (CAD) tools. Many 3D printers use an additive, layer-by-layer approach to building parts by joining materials to form physical objects. The data referenced in order to create the layers is generated from the CAD system using thin, horizontal cross-sections of the model. The prior art 3D printing systems that require heat to join the materials together generally employ high precision motion systems containing a multitude of actuators to generate 3D printed objects. In order to improve the useful applications for the 3D printed objects, there is a need for a system and method for 3D printers and RP systems that can print 3D objects directly onto permeable materials with a strong bond.

SUMMARY OF THE INVENTION

The present invention is directed towards a system and method for printing 31) objects directly onto permeable materials with a strong bond. In an embodiment, the 3D printed object can be printed with a 3D printer from thermoplastic materials as well as composite materials that include at least some thermoplastics. Suitable thermoplastic materials can include: polylactic acid (PLA), acrylonitrile butadiene styrene (ABS), polyether ether ketone (PEEK), polyaryletherketone (PAEK), polytetrafluoroethylene (PTFE), polyurethane (PU) (NinjaFlex), Nylon, or any other suitable thermoplastic material. Composite print materials can include both thermoplastic materials and filler can includes: (soft or hard) wood filled thermoplastics,(copper, bronze, stainless steel) metal filled thermoplastics and composites that can include any other suitable filler materials.

In some embodiments, the thermoplastic material can be printed directly onto a permeable material. The permeable material can be any material or structure having pores, recesses, openings through holes or pathways that allows the liquid state thermoplastic material being used to print the 3D object to pass at least partially through or be at least partially absorbed. Permeable materials can include any porous materials, textiles, fabrics, knits, woven materials, mesh, polymers, rubbers, foams, etc. The materials can be in the form of a flexible cloth, a sheet, a layer and other structures having pores, recesses, openings through holes or pathways through which the liquid state thermoplastic material can at least partially pass through.

In some embodiments, a thin layer of a thermoplastic elastomer (TPE) material such as thermoplastic polyurethane (TPU) can be printed as a heat seal layer(s) onto the porous materials as a bonding layer before another type of thermoplastic material is printed as build layer(s) onto heat seal layer on the porous material. In an embodiment, the TPU layer can be a thin "heat seal layer" that can be printed onto the porous material. In other embodiments the heat seal layer can consist of one or more heat activated TPE, materials formulated from polyurethane, nylon, polyester, polyolefin, vinyl and other suitable materials. In some embodiments, the heat seal material can be formulated to optimize the bonding with a specific porous material. The thin heat seal layer can function as an adhesive to bond the structure to the porous material and upon which additional build layers of a different thermoplastic material can be printed. Subsequent build layers of a different thermoplastic material can then be printed over the heat seal layer until the complete object(s) are printed.

In other embodiments, a porous material can be sandwiched between a first and second thermoplastic "heat seal layers" such as polyurethane one or more heat activated thermoplastic materials formulated from polyurethane, nylon, polyester, polyolefin, vinyl and other suitable materials. The first heat seal layer can be printed on the print plate. The porous material can be placed over the first heat seal layer and the second heat seal layer can flow through the pores of the porous material and fuse to the first heat seal layer so that the porous material is permanently sandwiched between the heat seal layers. Subsequent build layers of a different thermoplastic material can then be printed over the heat seal layers until the complete object(s) are printed.

In different embodiments, the three dimensional printer used to bond objects to the permeable material can have settings which can be controlled to optimize the bonding of the printed thermoplastics onto the permeable materials. In an embodiment the three dimensional printer used for this application can be a "plastic jet print" (PJP) or a "fused filament fabrication" (FFF) type three dimensional printer. The heat seal layer(s) can be printed from the PJP or FFF type three dimensional printers with a heat seal material filament. The heat seal layers that are made of a first thermoplastic material are bonded directly to the porous material. Build layers can then be printed on the heat seal layer(s) with a build material filament that is a different material than the heat seal filament, Once all the cross-sections are printed, the object(s) is completed. The print plate is then removed from the printer with the permeable material and the printed objects and soaked in water until the porous material and printed object(s) can be separated from the print plate.

The print temperature of the heat seal material will vary with the melt temperature of the print material. Adjusting the print temperature can affect the viscosity with a higher print temperature creating a lower viscosity thermoplastic and a lower print temperature producing a higher viscosity thermoplastic. A lower viscosity material may produce better adhesion for thicker porous materials where the thermoplastic must flow a longer distances for proper bonding. For example, the volume of the heat seal layer material output can depend upon the thickness and porosity of the permeable material. A thin material with only small pores will require less print material than a thick permeable material with many pores.

The thermoplastic material are used to print 3D objects can be stored in a solid form such as a filament stored on a spool prior to use. During printing, the thermoplastic material can be fed through a heated print nozzle in a print head. The heat can cause the thermoplastic material to liquefy and the 3D printer can print multiple layers sequentially to form the 3D objects. The 3D object can be attached to the permeable material at one side where the bottom layer of the 3D object can be attached to the permeable material. Alternatively, the 3D object can have an internal layer that is bonded to the permeable material where a portion of the 3D object is on one side of the permeable material and another portion of the 3D object is on an opposite side.

In order to improve the adhesion of the 3D object to the permeable material, a bonding layer of the thermoplastic material that is printed directly onto the permeable material can be deposited at modified 3D printer settings that can include a hotter than normal material deposition temperature. The higher temperature can result in a lower viscosity thermoplastic liquid that can more easily flow through the permeable material. In addition to a hotter deposition, the modified 3D printer settings can also include a faster material output rate and a slower print speed and a continuous spiraling tool path with no fill. The remaining build layers of the 3D object can be printed at normal 3D printer settings which can have a lower deposition temperature and may have a slower material deposition rate.

BRIEF DESCRIPTION OF THE DRAWINGS

FIG. 23 illustrates side view of an embodiment of a sandwich construction object bonded to a permeable material.

FIG. 24 illustrates an embodiment of a flow chart for creating a sandwich construction object bonded to a permeable material.

DETAILED DESCRIPTION

Figure 1:
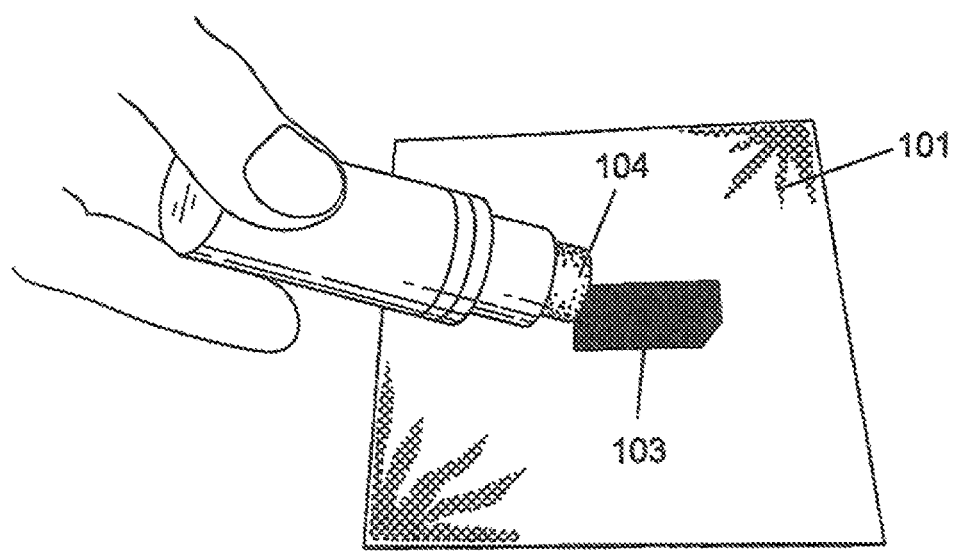
FIG. 1 illustrates a print plate with an adhesive applied.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three dimensional printing system," "three dimensional printer," "printing," and the like generally describe various solid freeform fabrication techniques for making three dimensional (3D) articles or objects by selective deposition, jetting, fused deposition modeling, and other techniques now known in the art or that may be known in the future that use a build material or print material to fabricate the three dimensional object.

As understood by one of ordinary skill in the art and as described further herein, 3D printing can include selectively depositing layers of a fluid build or print material to form a 3D article on a substrate such as a print pad. In general, a fluid print material can be deposited onto a print pad through a dispenser, which may be a heated nozzle through which a filament print material is fed to generally melt the filament print material and dispense the print material from the exit of the dispenser. Any print material not inconsistent with the objectives of the present invention may be used. In some embodiments, the print material comprises an organic composition such as organic polymeric composition or alternatively composite materials that include thermoplastics and filler materials. For example, in some embodiments, the print material can be made of: polylactic acid (PLA), acrylonitrile butadiene styrene (ABS) polymer, polyether ether ketone (PEEK), polyaryletherketone (PAEK), polytetrafluoroethylene (PTFE), polyurethane (PU) (NinjaFlex), Nylon and other thermoplastic materials. Other suitable polymers thermoplastic and filler materials may also be used as a print material.

The present invention is directed towards a system and method for printing thermoplastic material directly to permeable materials with a strong bond. The term "permeable" may be used to refer generally to any material or structure that allows the liquid state thermoplastic material being used to print the 3D object to pass at least partially through or be at least partially absorbed. The permeable materials can be a porous material such as textiles, fabrics, knits, woven materials, mesh, polymers, rubbers, foams, etc. The materials can be in the form of a flexible cloth, a sheet, a layer and other structures.

In an embodiment, a fused deposition modeling type 3D printer can be used to print 3D objects directly onto the porous materials. A design file representing the 3D object designs can be stored or provided to the fused deposition modeling printer. The design file can include data for many parallel planar layers of the 3D object that are fused to form the complete object. The 3D object can be printed using an "additive" process where a filament supplies thermoplastic material to a heated print head, which is precisely moved to create each layer of the 3D object from the design file as the liquefied filament material is emitted from the print head. The thermoplastic material can be printed directly onto the permeable material placed in the 3D printer.

With reference to FIG. 1, in an embodiment an area of the print plate surface 101 can be coated with an adhesive 103 using a sponge tip applicator 104. In an embodiment, an adhesive 103 coating thickness of 0.05-0.1 millimeter can be applied to a print plate 101 of the 3D printer. A suitable adhesive 103 is described in U.S. Patent Publication No. 2013/0310507, "Adhesive For 3D Printing" which is hereby incorporated by reference in its entirety. The adhesive 103 can be applied to an area of the print plate 101 that is about the size of the first layer of the 3D object that is printed onto the permeable material.

Figure 2:
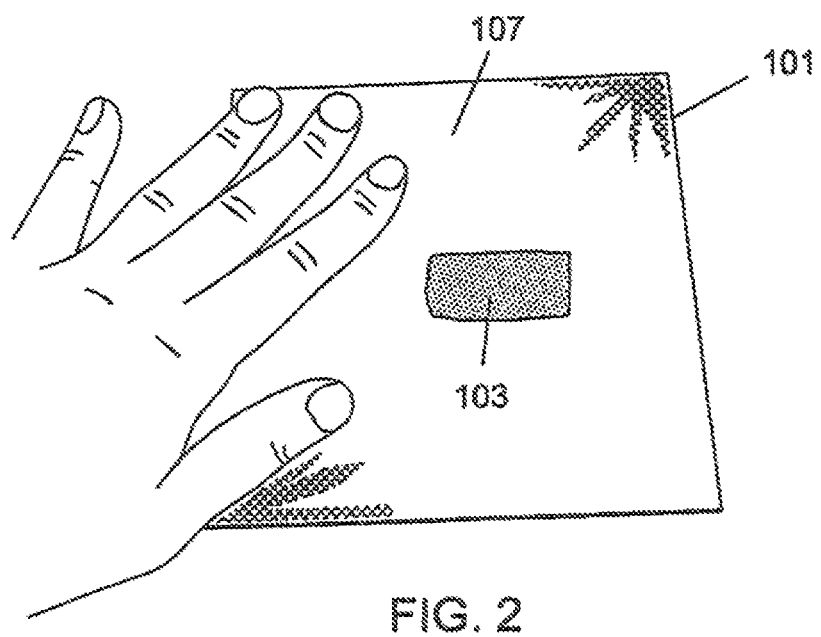
FIG. 2 illustrates a permeable material placed over the adhesive on the print plate.

With reference to FIG. 2, a sheet of permeable material 107 is placed on the print plate 101 over the adhesive 103. In this example, the permeable material 107 is a layer of woven fabric. The adhesive 103 can contact and stick to the lower surface of the permeable material 107. The adhesive 103 can function to hold the print area of the permeable material 107 stationary on the print plate 101 during the 3D printing process. Although this embodiment of the invention uses the adhesive 103 to hold the permeable material 107 in place, in other embodiments any other types of mechanism can be used to hold the permeable material 107 in place such as clips or other fasteners mounted on the print plate 101 or other types of systems such as air fans directing an air flow at the permeable material 107 and the print plate 101.

Figure 3:
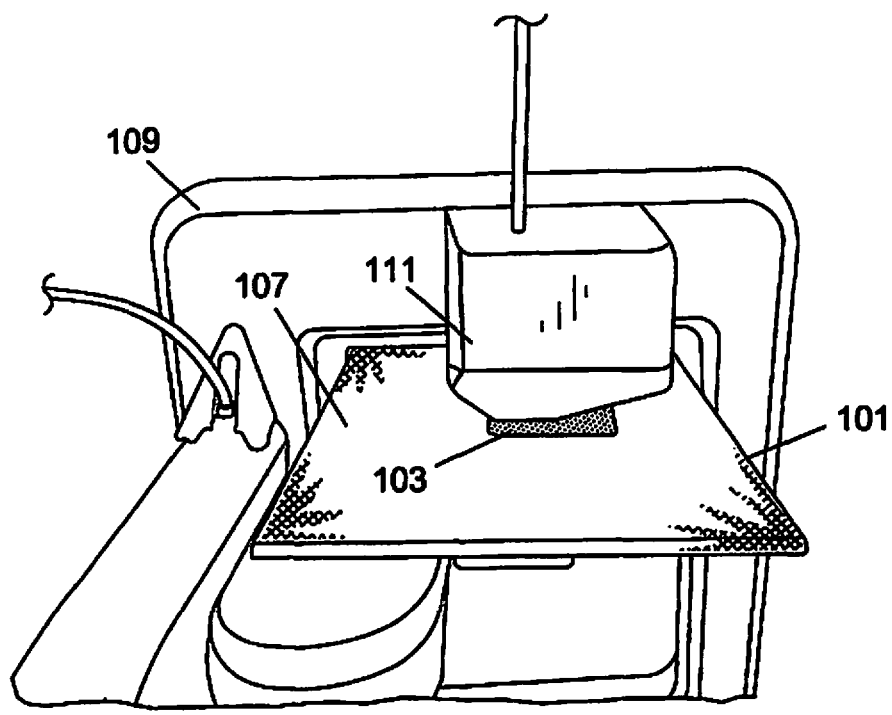
FIG. 3 illustrates a 3D printer depositing material on a permeable material.

With reference to FIG. 3, the print plate 101 can be installed in the 3D printer 109 and the position of the print head 111 can be vertically positioned over the permeable material 107 and the adhesive 103. The output nozzle of the print head 111 can be positioned within 1 centimeter or less of the upper surface of the permeable material 107. Once the permeable material 107 is properly positioned and the nozzle height is set, a bonding layer of the 3D object can be printed onto the permeable material 107 at modified 3D printer settings. After the bonding layer is deposited, the space between the upper surface of the bonding layer of the 3D object and the print head nozzle can be adjusted to be less than 1 centimeter or less and the first build layer of the 3D object can be deposited on the bonding layer. The first build layer and all subsequent build layers can be deposited at normal 3D printer settings having a lower material output temperature.

Thermoplastic materials can have different 3D print settings depending upon the type of material being printed, the permeable material being printed onto and the portion of the object being printed. For example, in order to improve the adhesion of the printed 3D object onto the permeable material, the bonding layer of material printed directly onto the permeable material can use modified 3D printer settings.

The modified 3D printer settings used for the bonding layer can be different than the normal 3D printer settings used to print other build layers of the 3D object being printed. For example, the filament print temperature of the bonding layer of material printed directly onto the permeable material can be higher than the normal build layer print temperature for the material being printed. For example, in an embodiment of the invention, the bonding layer printed directly onto the permeable material can be about 270-280 degrees Centigrade for PLA material.

In this example, the print temperature of the PLA material in the first layer printed directly onto the permeable material is higher than normal, which results in the PLA having a lower viscosity. Because the material viscosity can be lower and the flow rate of the material can be higher. Some of the material printed directly onto the permeable material can be absorbed by the material or flow through the permeable material. In order to compensate for this material that flows into the permeable material the material flow rate for the bonding layer can be higher than the normal material flow rate for the formation of subsequent build layers or layers formed on a print plate, In other embodiments, the modified flow rate of the PLA material printed directly onto the permeable material can depend upon the absorption rate of the permeable material. A material that has a low porosity or a lower permeability volume can have a lower material flow rate than a material that is very porous or has a high permeability volume. Thicker permeability materials may require a higher flow rate than a thinner permeable material. Thus, in an embodiment, the 3D printer settings can be based upon the material being used to print and the permeable material which is being printed on. The optimum 3D printer settings can be determined empirically through experimentation and adhesion testing of 3D objects printed onto the permeable materials.

Once the bonding layer of thermoplastic material has been printed onto the permeable material, the print head can be repositioned vertically relative to the print plate and additional build layers can be printed on the completed bonding layer. For these subsequent build layers the 3D printer settings can be changed back to the normal settings with a lower material print temperature. After each build layer of the 3D object is printed the relative position of the print head and the print plate can be increased and an adjacent new build layer can be printed on the previously printed build layer according to the design data. This process can be repeated until the 3D object is completely formed.

Figure 4:
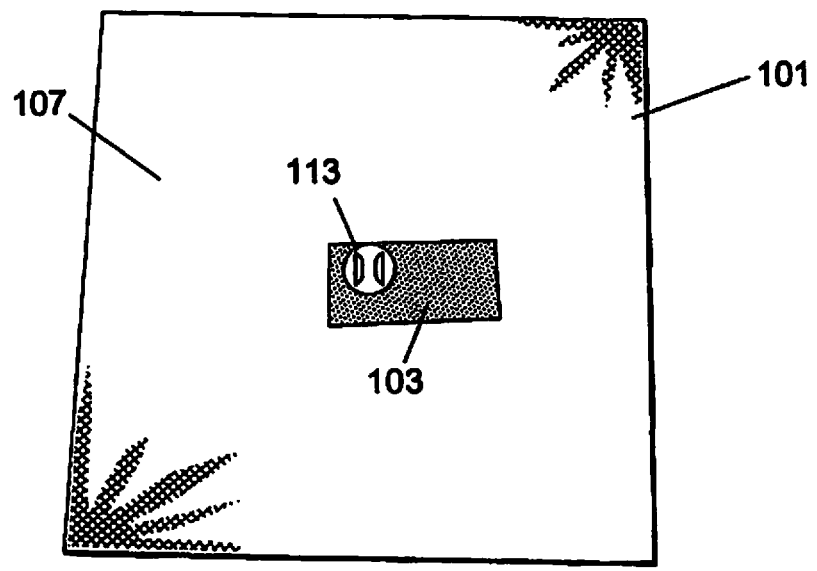
FIG. 4 illustrates a print plate with a 3D object printed on a permeable material.

In this example with reference to FIG. 4, the print plate 101 has been removed from the 3D printer and the 3D object 113 printed on the permeable material 107 is a connector. In an embodiment, the adhesive can be water-soluble. For example, the adhesives, in some embodiments, may comprise a polymeric component that can include a water-soluble polymer such as an ionic polymer, a polar polymer, or a hydrophilic polymer. In other embodiments, it may be possible to separate the 3D objected from the print plate 101 using other methods. For example, a tool such as a scraper having a thin blade, can be slid across the surface of the print plate 101 to separate all 3D object 113 that have been printed on the print plate 101. If an adhesive is not used to secure the permeable material 107 to the print plate 101, the connection mechanism being used can be released or turned off, such as clips, fasteners, air flow, etc.

Figure 5:
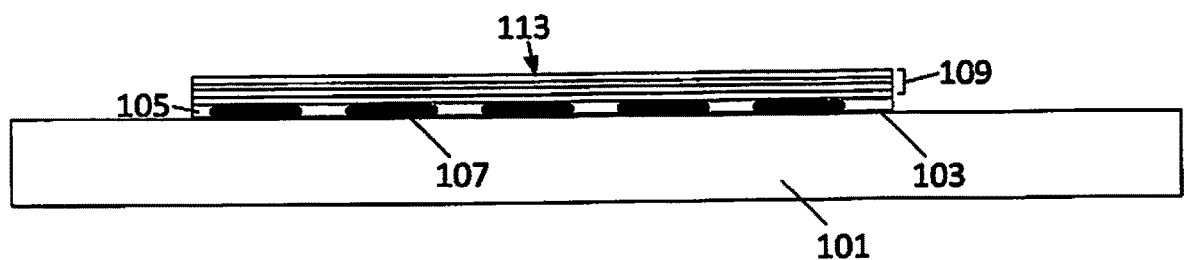
FIG. 5 illustrates a cross section of a 3D object printed on a permeable material.

With reference to FIG. 5, a cross section of a lower portion of the 3D object 113 printed on a permeable material 107 is illustrated. The permeable material 107 can be held in a stationary position on the print plate 101 with an adhesive 103. The first layer 105 of the 3D object 121 can be hotter than normal and have a lower viscosity. Thus, the bonding layer 105 can be absorbed by the permeable material 107 and the bonding layer 105 material can flow through pores in the permeable material 107. This absorption or saturation of the permeable material 107 with the bonding layer 105 can improve the bonding strength of the 3D object to the permeable material 107. The subsequent build layers 109 of the printed at normal 3D printer settings which can have a lower deposition temperature than the bonding layer 105.

Figure 6:
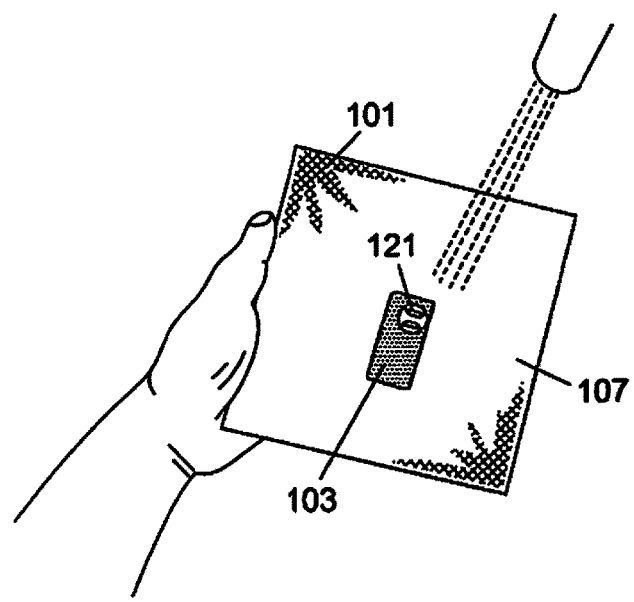
FIG. 6 illustrates a 3D object printed on a permeable material being separated from a print plate.
Figure 7:
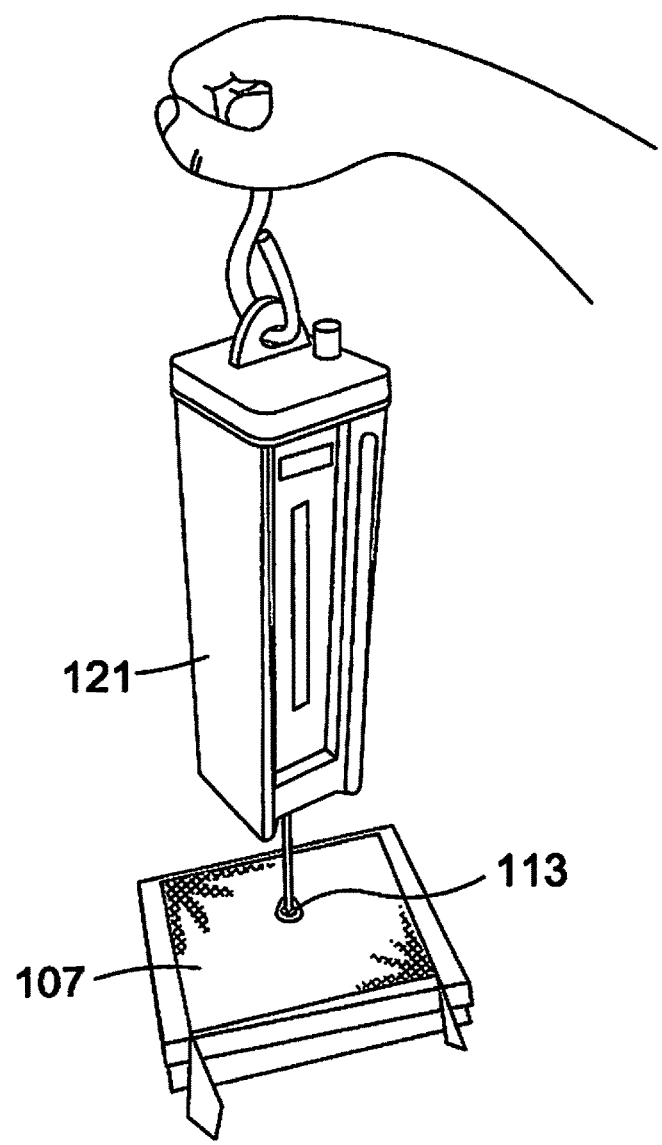
FIG. 7 illustrates a 3D connector being tested for adhesion to the permeable material.

With reference to FIG. 6, the print plate 101with the permeable material 107 and printed 3D object 121 connector can be placed in water to dissolve the adhesive 103. After the adhesive 103 is dissolved, the permeable material 107 with the attached connector 121 can be removed from the print plate 101. With reference to FIG. 7, pull tests were performed to determine the bonding performance of connectors 113 printed on the permeable fabric 107. In this example, the permeable material 107 was attached on a stationary structure and an upward force was applied to the connector 113. A scale 121 was used to measure the force upward force applied to the connector.

Figure 8:
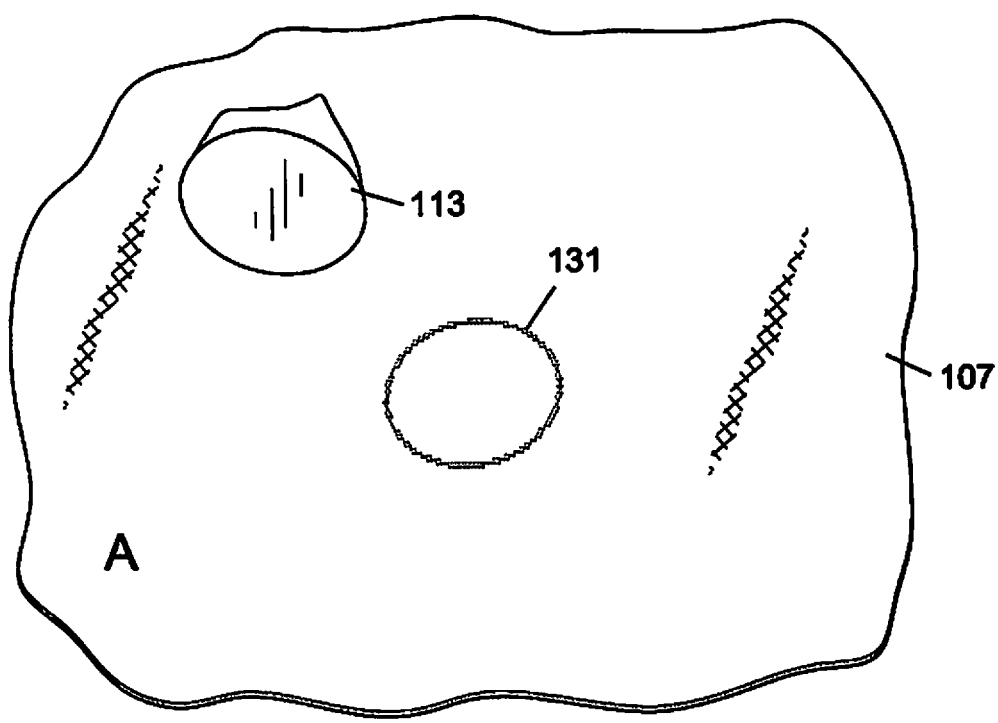
FIG. 8 illustrates a 3D connector pull test result using normal 3D printer settings.

FIG. 8 shows a 3D printed connector 113 that was printed on the permeable material 107 using the normal print settings for all of the layers printed to form the connector 113. The diameter of the connector 113 at the junction with the permeable material 107 is 0.50 inch. During testing, the connector 113 has pulled off the permeable material 107 with a force of about 3 lbs. at a pressure of about 38.5 lbs/in$^2$. The only visible marking is a ring 131 on the permeable material 107 where the connector 113 was printed. The surfaces of the permeable material within the circle appear to be intact which may indicate that the physical connection in this area between the printed connector 113 and the permeable material 107 was weak.

Figure 9:
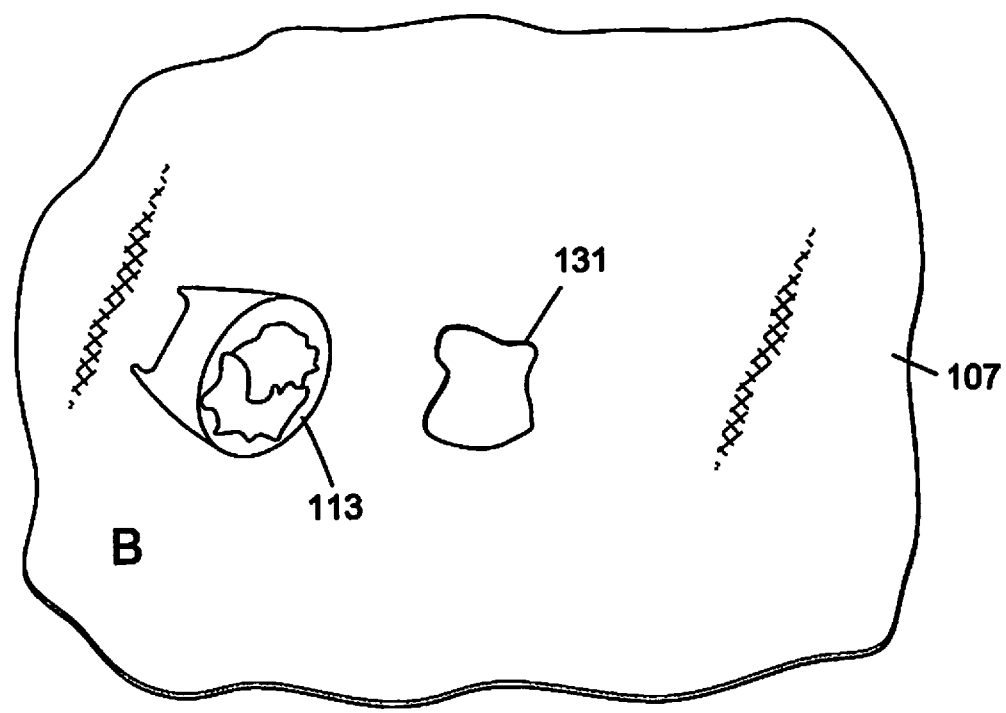
FIG. 9 illustrates a 3D connector pull test result using modified 3D printer settings.

FIG. 9 shows a connector 113 that was printed on the permeable material 113 using the modified print settings for the bonding layer printed directly onto the permeable material 113 while all other build layers were at normal print settings. The connector 113 illustrated in FIG. 8 is identical to the connector 113 illustrated in FIG. 8. At a pressure of about 66 lb/in$^2$, the permeable material 107 tore at the connection area with the connector 113, away leaving a hole 135 in the material 107 that matches the contact area with the connector 113. This material 107 failure suggests that the bond between the permeable material 107 and the connector 113 formed with the modified 3D printer settings was stronger than the shear tear strength of permeable material 107 itself resulting in a connection strength more than 70% stronger than the normal setting print adhesion described above.

Figure 10:
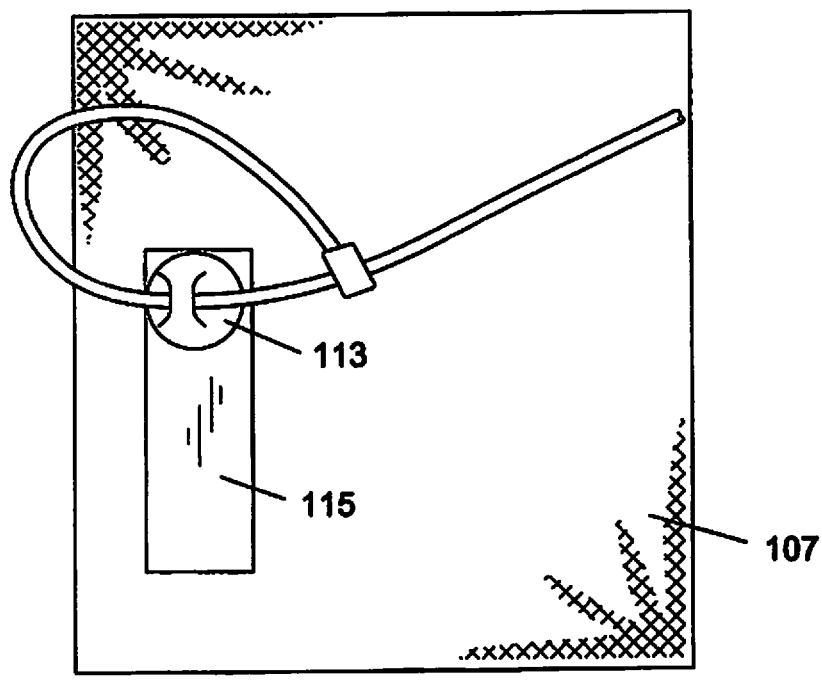
FIG. 10 illustrates a 3D connector peel test result using normal 3D printer settings.
Figure 11:
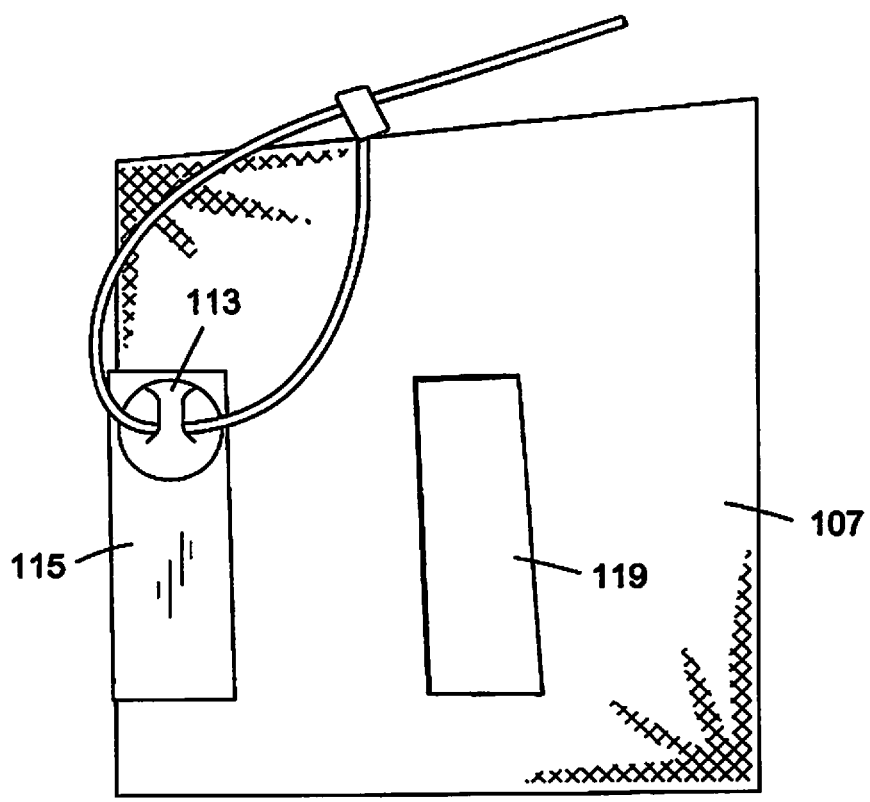
FIG. 11 illustrates a 3D connector peel test result using modified 3D printer settings.

With reference to FIGS. 10 and 11, "peel" tests were performed on elongated peel connectors 115. The peel connectors 115 in the illustrated examples have a connector 113 at one end of a flat rectangular structure that is attached to the permeable material 107. The peel testing can include connecting the connector 113 to a measured force. Because the peel connector 115 are elongated, the connector 113 end will peel away from the permeable material 107 before the rest of the peel connector 115 which is different than a pure tensile test shown in FIGS. 8 and 9. FIG. 10 illustrates a peel connector 115 in which all layers were printed using normal print settings. At a pressure of about 15.5 psi., the peel connector 115 peeled away from the permeable material 107. Eke the test results illustrated in FIG. 8, there are almost no visible marks where the peel connector 115 pulled material away from the permeable material 107. Thus, the failure shown in FIG. 10 was due to a failure of the bond between the connector 115 and the permeable material 107. FIG. 11 illustrates a peel connector 115 formed using the modified hotter print settings for the first layer printed directly onto the permeable material 107. At a force of about 12.12 lbs. and a pressure of about 15.5 psi., the permeable material 107 tore away. Like FIG. 9, permeable material 107 failed before the bonded area of the peel connector 115 resulting in a hole 119 where the material surrounding the connector 115 failed.

Figure 12:
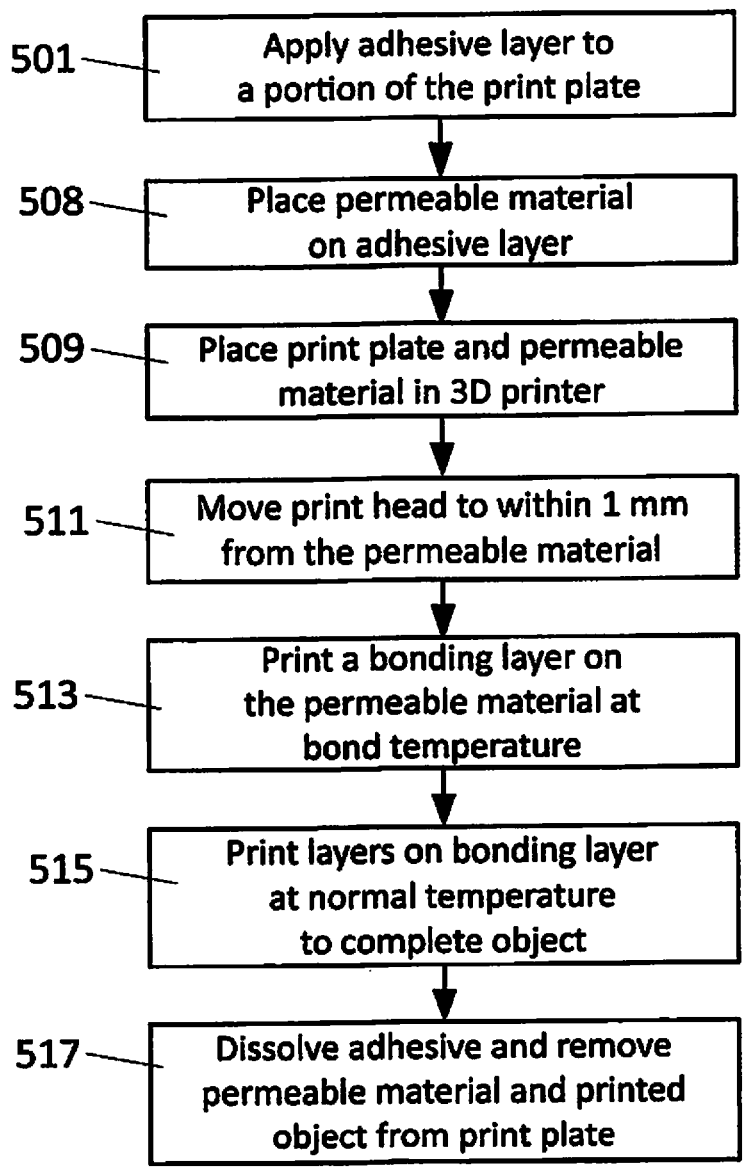
FIG. 12 illustrates flow chart of a process for printing a 3D object onto a permeable material.

With reference to FIG. 12, a flow chart illustrating steps for printing a 3D object onto a permeable material with improved bonding between a permeable material and the 3D printed object. At step 501, an adhesive material is applied to the print plate as illustrated in FIG. 1. At step 508, the permeable material is placed on the adhesive layer as shown in FIG. 2. At step 509, the print plate and permeable material are placed in the 3D printer. At step 511 the print head of the 3D printer is moved within 1 centimeter or less such as within 1 millimeter of the permeable material. At step 513 the 3D printer prints a bonding layer directly on the permeable material at bond layer printer settings which has a higher material temperature. At step 515, additional build layers are printed on the bonding layer to complete the 3D object. At step 517 remove print plate from the 3D printer and use water to dissolve the adhesive and then remove the permeable material and 3D printed object from the print plate.

Figure 13:
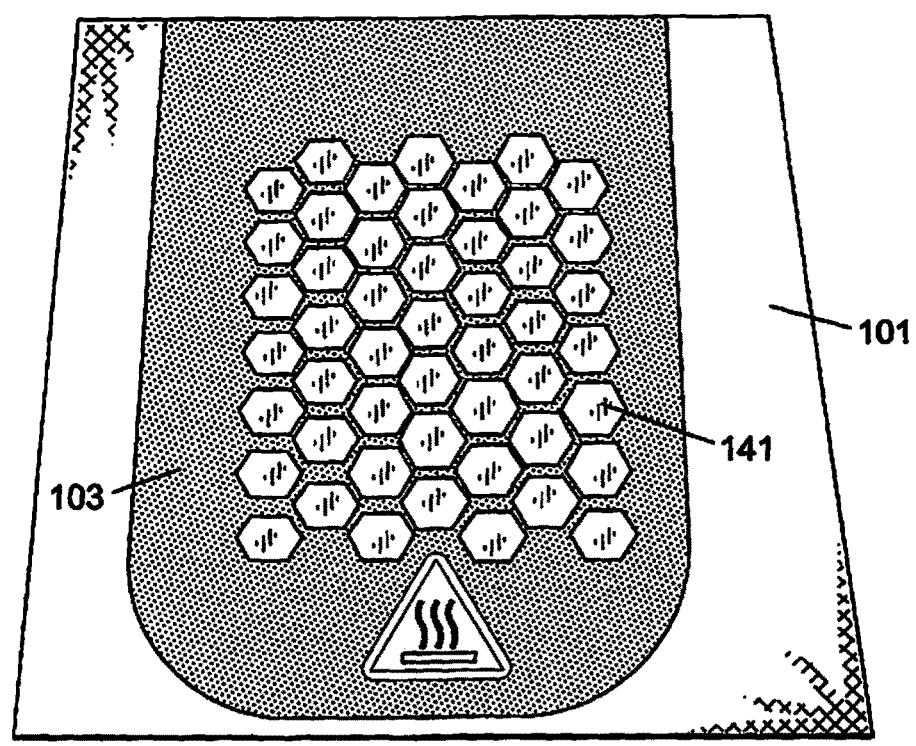
FIG. 13 illustrates a print plate with under structures.
Figure 14:
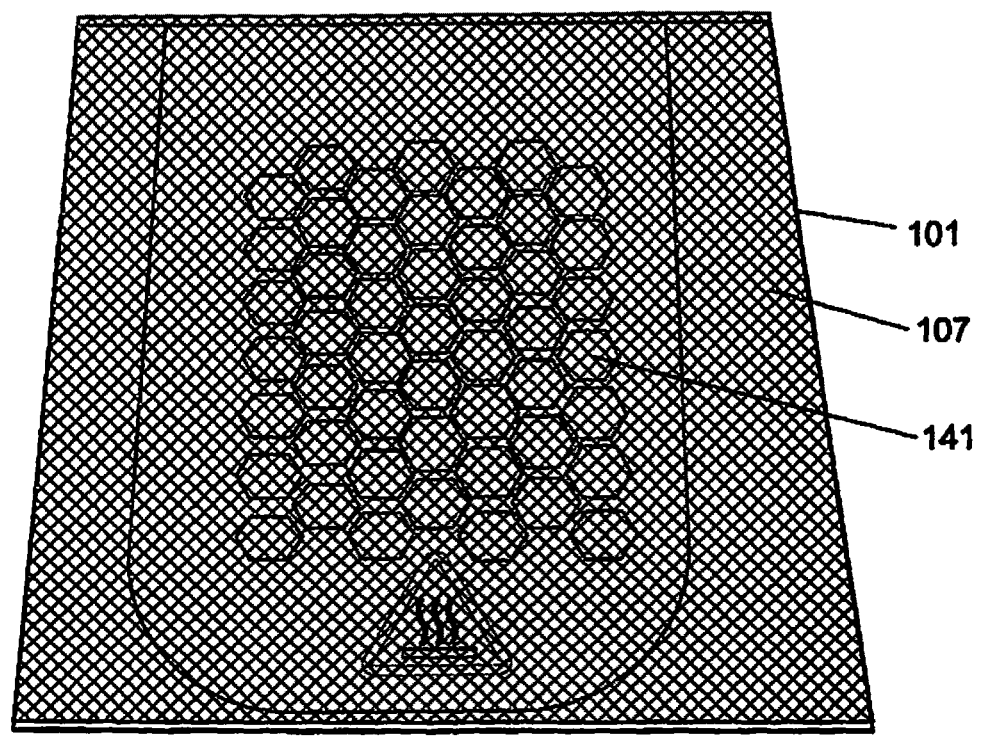
FIG. 14 illustrates a permeable material placed on the under structures and print plate.

In other embodiments, different processes can be used to securely print 3D objects to a permeable material. With reference to FIG. 13, a print plate 101 is illustrated that is covered with a layer of an adhesive 103. A plurality of under structures 141 have been printed on the adhesive layer 103 by a 3D printer at normal print settings. Although the under structures 141 appear to have a significant thickness of possibly 0.1-0.25 inch, in other embodiments, the under structure can be very thin. For example, the under structure can be just one layer of deposited material having a thickness of less than 0.001 inch. With reference to FIG. 14, a permeable material 107 has been placed on the plurality of under structures 141. In this example, the permeable material 107 is a sheet of material with a plurality of large fenestration through holes so the under structures are visible through the holes in the permeable material.

Figure 15:
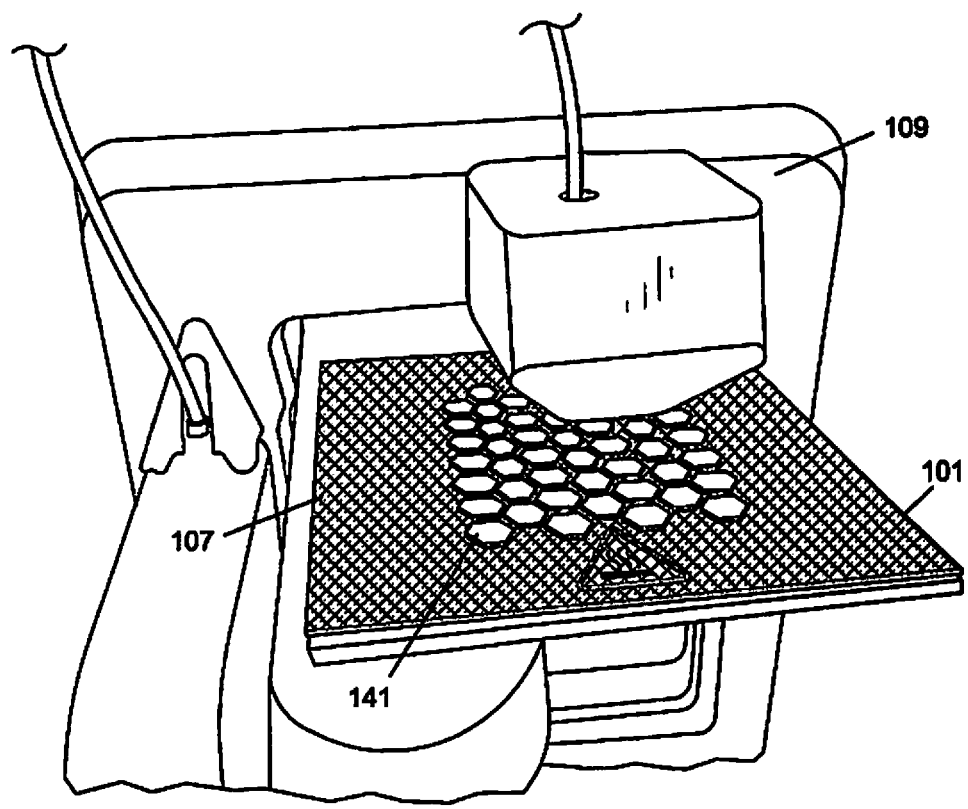
FIG. 15 illustrates the permeable material, under structure and print plate in a 3D printer.

With reference to FIG. 15, the under structures 141, permeable material 107 and print plate 101 have been placed in a 3D printer 109. A bonding layer 143 is printed directly on the permeable material 107 and the under structures 141. The bonding layer 143 can be deposited at modified printer setting which include a higher deposition temperature. The thermoplastic material of the bonding layer 143 can flow through orifices in the permeable material 107 and fuse with the under structure 141. Thus, the under structure 141 and the bonding layer 143 can be fused through the orifices in the permeable material 107. Additional build layers 145 are printed on the bonding layer 143 at normal printer settings until the 3D objects 147 are completed.

Figure 16:
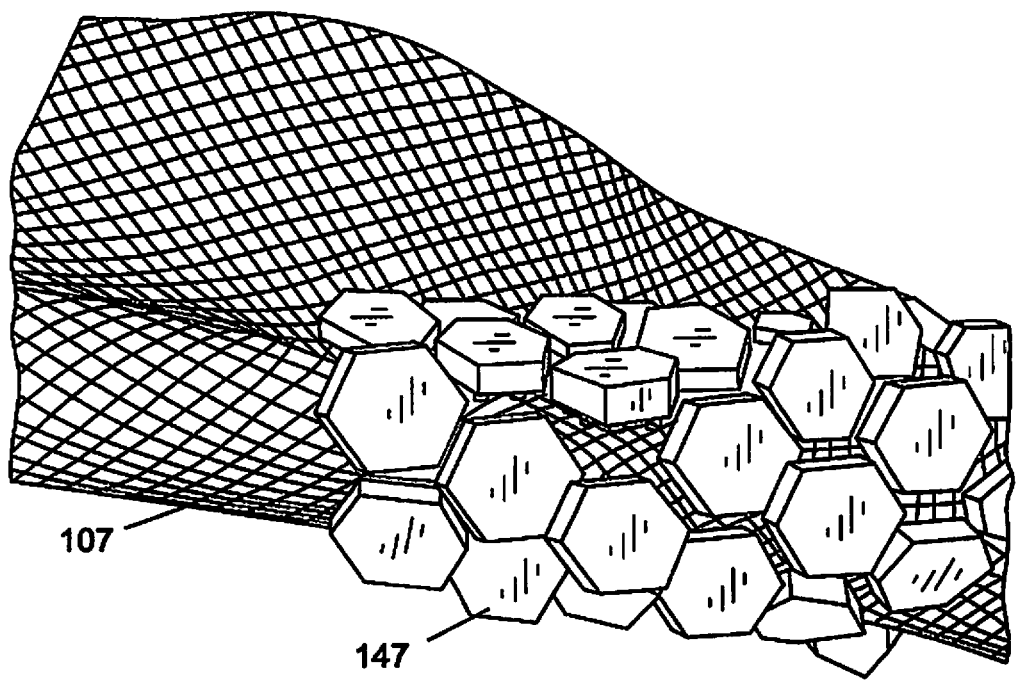
FIG. 16 illustrates 3D objects printed on a permeable material.

After the 3D objects 147 are printed, the 3D objects 147 and permeable material 107 can be separated from the print plate 101 as illustrated in FIG. 16. In an embodiment, the print plate 101 can be exposed to water to dissolve the adhesive 103. After the adhesive 103 is dissolved, the 3D objects 147 and permeable material 107 can be separated from the print plate 101. In other embodiments, it may be possible to separate the 3D objected from the print plate 101 by using a tool such as a scraper which can be forced across the surface of the print plate 101 to separate all materials that have been printed on the print plate 101. Again, if the adhesive 103 is not used, the coupling mechanism being used can be released to separate the permeable material 107 from the print plate 101.

Figure 17:
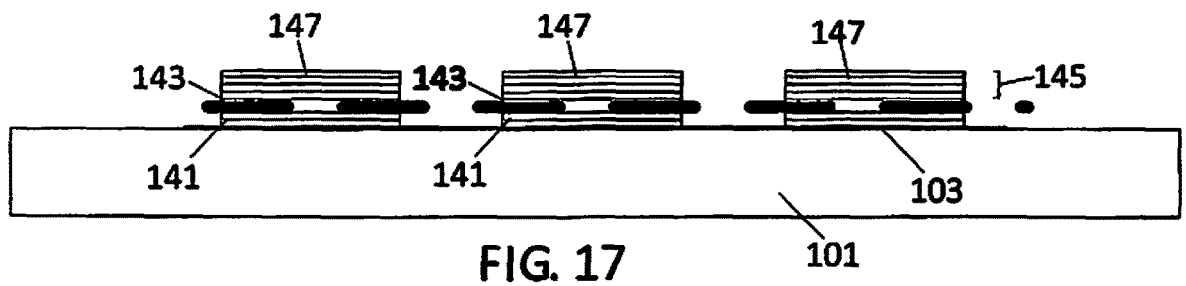
FIG. 17 illustrates a cross section of a 3D object printed on a permeable material.

FIG. 17 illustrates an embodiment of a cross section of the 3D objects 147 printed on the adhesive 103 on the print plate 101. The permeable material 107 is placed over the under structures 141 and the bonding layer 143 which can be deposited at a hotter temperature can flow through the permeable material and fuse to the under structure 141. Additional layers are deposited on the bonding layer 143 to complete the 3D objects 147.

Figure 18:
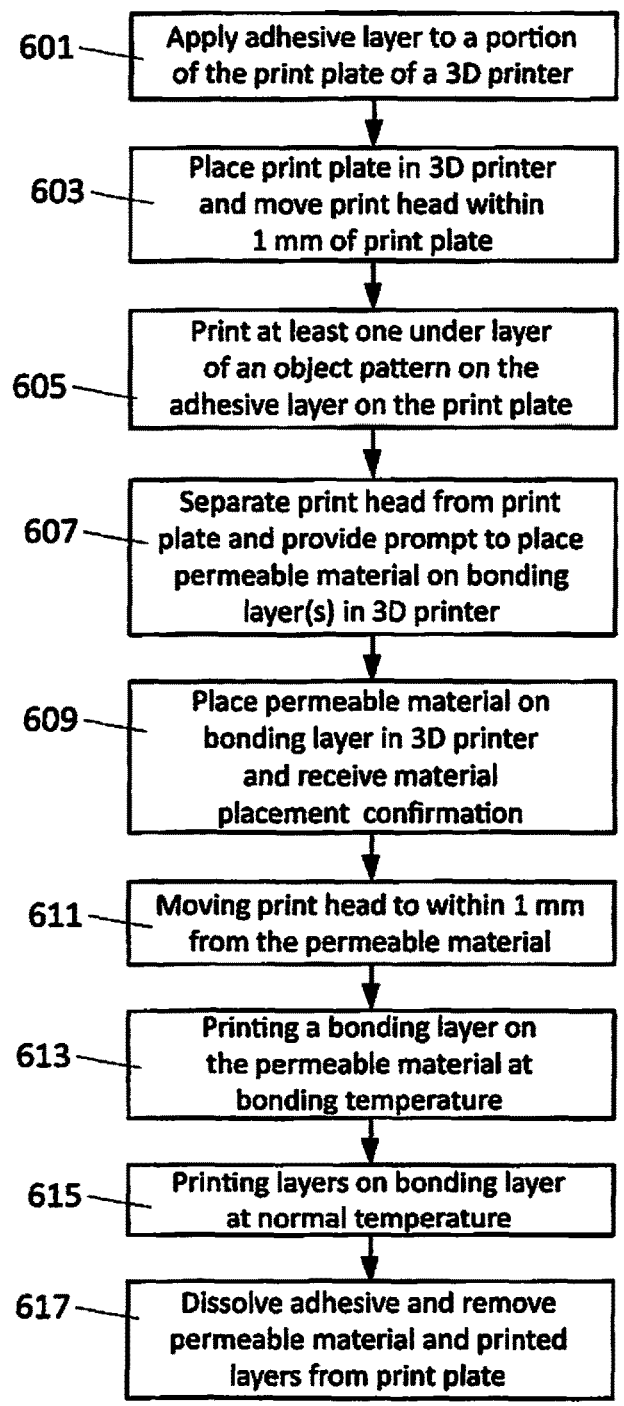
FIG. 18 illustrates flow chart of a process for printing a 3D object onto a permeable material.

With reference to FIG. 18, a flow chart illustrating steps in an alternative method for printing a 3D object onto a permeable material with improved bonding between a. permeable material and the 3D printed object. At step 601, an adhesive material is applied to the print plate. At step 603, the print plate and adhesive layer are placed in a 3D printer and the print head of the 3D printer is moved within 1 centimeter or less, possibly within about 1 millimeter of the adhesive layer on the print plate. At step 605, the 3D printer prints an under structure(s) which is at least one layer thick on the print plate as shown in FIG. 13. At step 607, after the under structure(s) is printed the print head is separated from the print plate so that there is sufficient space for the permeable material to be inserted on the under layer in the 3D printer. At step 609, the permeable material is placed on the under structures in the 3D printer as shown in FIG. 14. The 3D printer operator may press a confirmation button to inform the printer that the permeable material is in place and the distance between the print head and the permeable material can be decreased. At step 611 the print head of the 3D printer is moved within 1 centimeter or less such as within 1 millimeter of the permeable material as shown in FIG. 15. At step 613 the 3D printer prints a bonding layer directly on the permeable material at modified printer settings which can have a higher material output temperature. The higher temperature can cause the bonding layer to flow through the permeable material and bond to the under layer. At step 615, print additional build layers are printed on the bonding layer to complete the 3D object. At step 617 remove print plate o the 3D printer and use water to dissolve the adhesive and then remove the permeable material and printed object from the print plate as shown in FIG. 16.

Figure 19:
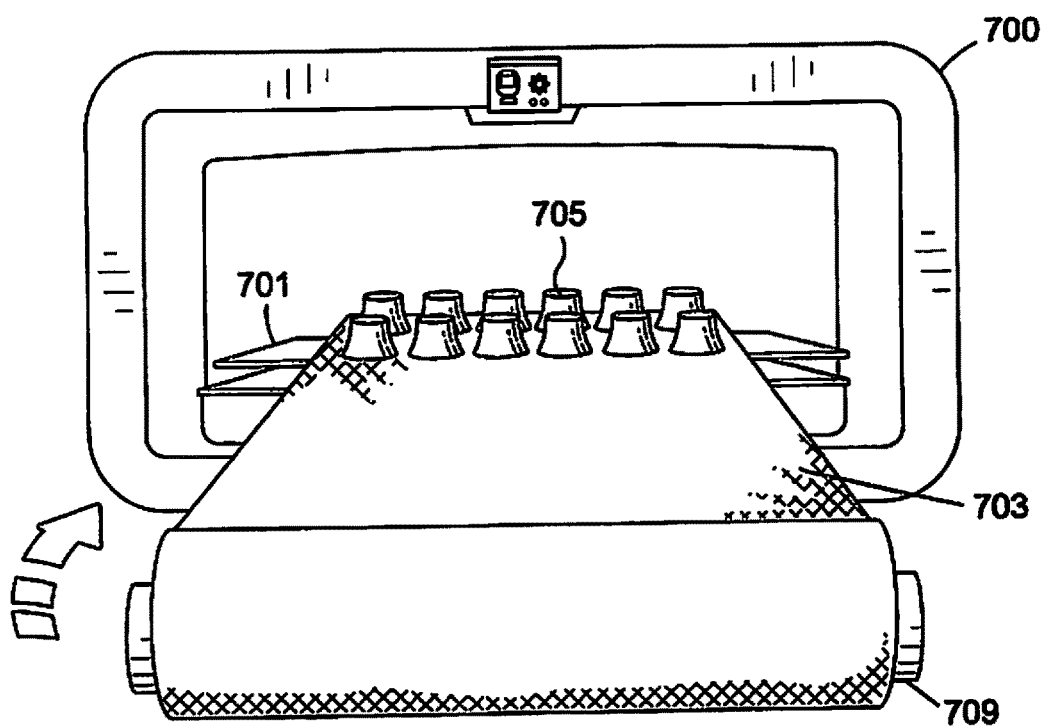
FIGS. 19-20 illustrate embodiments of 3D printers for printing 3D objects onto rolls of permeable materials.

In the described embodiments, the process for 3D printing onto a permeable material has been described as a single printing job process wherein the permeable material is completely removed from the 3D printer when each 3D printing job is complete. However, it is also possible to print multiple 3D objects onto a single piece of material or a roll 709 of permeable material. With reference to FIG. 19, a 3D printer 700 is illustrated that includes a roll of permeable material 703 and a mechanism to feed the permeable material 703 onto the print pate 701 and through the printing region of the 3D printer 700. In this embodiment, an unprinted portion of the permeable material 703 can be positioned on the print plate 701 and held stationary during the 3D printing process.

In the illustrated embodiment, the permeable material 703 can be stored on a roll on one side of the 3D printer 700. The rollers 709 can hold the permeable material in tension on the print plate 701. The permeable material 703 can be temporarily secured to the print plate 701 with a mechanism such as clamps, vacuum or other securing mechanisms. In the clamp embodiment, clamp mechanisms can compress and secure a portion of the permeable material 703 against the print plate 701 throughout the 3D print process. When the 3D object 705 has been printed on the permeable material 703, the clamp mechanisms can be released so that the permeable material 703 can be moved.

In the vacuum embodiment, the print plate 701 may have a plurality of vacuum holes. A vacuum pump can be coupled to the holes and the vacuum pump can draw air in from the print plate 701 surface creating a vacuum force that can cause the permeable material 703 to be held securely against the print plate 701. The vacuum can be applied throughout the 3D print process. When the 3D object(s) 705 has been printed, the vacuum pump can be turned off and the vacuum force can be removed to allow the permeable material 703 to be moved over the print plate 701. Once the permeable material 703 is repositioned in the 3D printer 700, the vacuum can be applied to secure the permeable material 703 against the print plate 701 and the 3D print process can be repeated.

In other embodiments, the weight of the permeable material 703 and friction between the print plate 701 and the permeable material 703 can be sufficient to hold the permeable material 703 in a stationary position on the print plate 701 during the 3D printing process. Thus, an adhesive may not be necessary to hold the permeable material 703 in a stationary position on the print plate 701.

A bonding layer of print material can be printed directly onto the permeable material 703 at a higher than normal print material temperature. After the bonding layer is printed, the 3D printer settings can be changed back to normal printer settings and subsequent build layers can be deposited on the bonding layer at a lower temperature. The subsequent layers can complete a first group of objects 705 printed on the permeable material 703 in the 3D printer 700. Once the 3D objects 705 are printed on the permeable material 703, the securing mechanisms can be released and rollers can move more of the permeable material 703 into the 3D printer 700. The new permeable material 703 can be secured to the print plate 701 and the described process can be repeated to print the 3D objects 705 as described above. The bonding layer of the 3D object can be printed at modified print settings with a higher than normal material temperature. Subsequent build layers can be deposited with the normal 3D printer settings with a lower material temperature setting.

Figure 20:
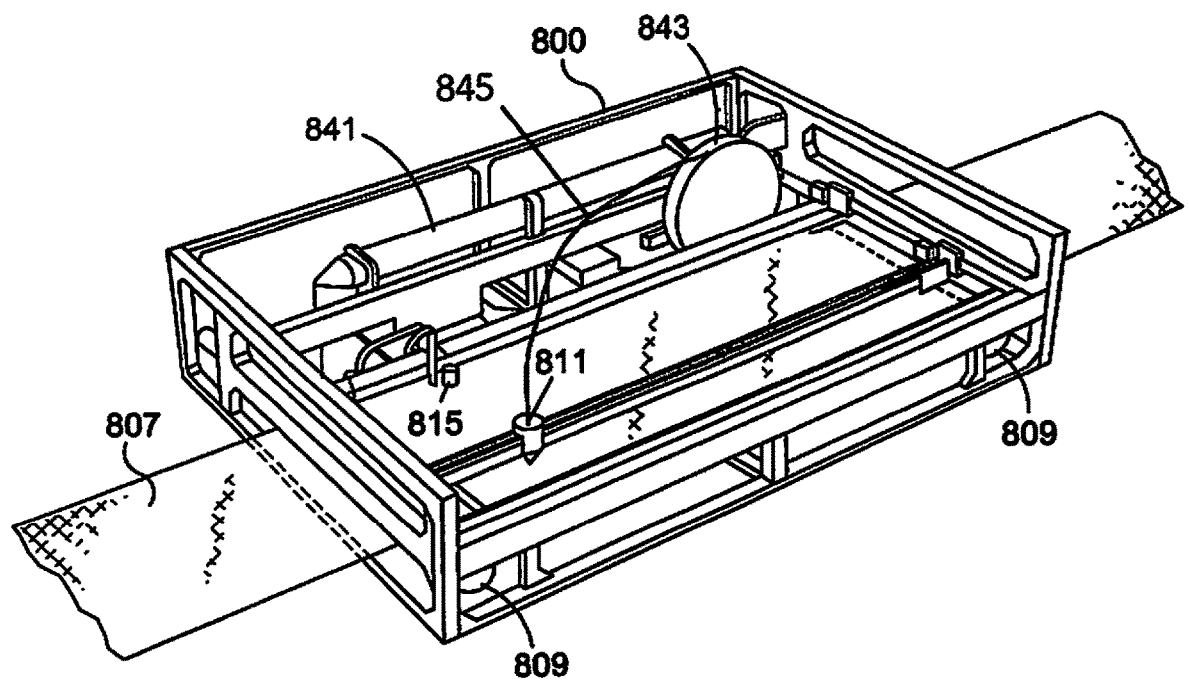

With reference to FIG. 20, another embodiment of a permeable material 3D printer 801 is illustrated. In this embodiment, the 3D printer 800 can include fabric rollers 809 that hold the permeable material 807 in a stationary position in the horizontal X-Y plane of the printer 800. A bonding layer of a 3D object can be printed at a higher than normal material temperature and subsequent build layers can be deposited at a normal print temperature. The fused deposition modeling nozzle 811 can move in a horizontal X-Y plane and deposit heated liquid state thermoplastic material to form the layers of the 3D objects being printed on the permeable material 807. A filament 845 can be stored on a spool 843 and fed to the fused deposition modeling nozzle 811. After each layer of the 3D objects has been printed, the vertical spacing between the fused deposition modeling nozzle 811 and the print plate 801 can be increased by moving the fused deposition modeling nozzle 811 vertically, or by moving the print plate 801 vertically. The layers of the objects are printed until the 3D objects have been completely formed. Once the 3D object(s) has been printed, the fabric rollers 809 can be used to move a clean portion of the porous permeable material 807 onto the print plate under the fused deposition modeling nozzle 811.

In an embodiment, a cutter such as a laser cutter 815 and a laser tube 841 can be used to cut the permeable material 807. The laser tube 841 can produce a laser beam that is directed to the laser cutter 815 that can move in a horizontal X-Y plane and can be turned on to emit a laser beam to cut the permeable material 807. A laser cutter 815 can have controls that allow the permeable material 807 to be cut into any desired shape or simply straight across the fabric roll. The laser cutter 815 can function by directing the output of a high-power laser through optics. The laser optics can be controlled by CNC (computer numerical control) to direct the laser beam from the laser tube 841 to the laser cutter 815 for cutting the permeable material within the 3D printer 800. By actuating the laser optics with a motion control system, a CNC of the pattern can be cut onto the material. The focused laser beam is directed at the material 807, which then either melts, burns, or vaporizes away the permeable material 107 leaving an edge with a high-quality surface finish. In an embodiment the laser cutter 815 can also be used to cut through the 3D object(s) printed on the permeable material.

The cut permeable material can be part or component of a separate assembly such as a garment which can have integrated and fused 3D printed objects. For example, it may be desirable to have socks that have built in protective shin guards. In an embodiment, the shin guard can be printed on pieces of permeable material that are then cut and assembled with other components to be a front portion of the socks. The bond between the fabric and the shin guard can eliminate the need for straps or elastic which are normally used to hold the shin guards to the user's legs.

In another embodiment, an ink printer mechanism can be incorporated into the 3D printer for coloring or marking portions of the permeable material 807. In this embodiment, a print head which can include black and colored ink cartridges can be placed on a movable print head which can be moved across the permeable material 807 in the 3D printer 800. The ink printer head can move in a horizontal X-Y plane and deposit liquid ink which then dries on the permeable material 807. An ink print design can be stored in memory and the printer can print the stored design on the permeable material 807. The ink printing can function to add ornamental markings to the permeable material 807 and printed objects. Alternatively, the markings can indicate a pattern to be cut, the locations of additional components, couplings, etc. The color printing processing can occur before, during or after the 3D object is printed on the permeable material 807.

Figure 21:
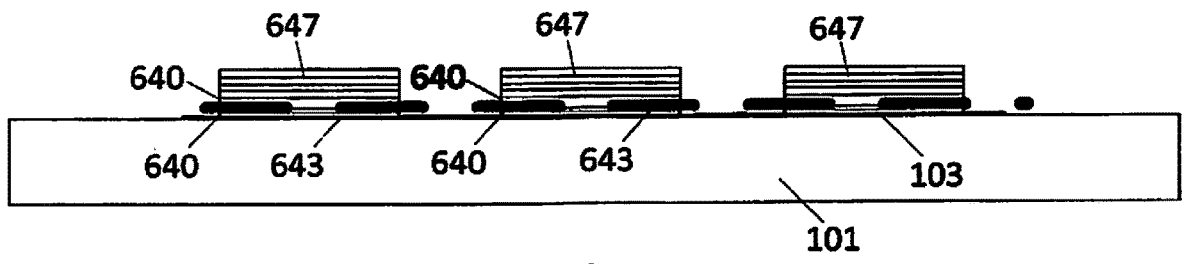
FIG. 21 illustrates a side view of an embodiment of an object bonded to a permeable material with a first heat seal layer.

FIG. 21 illustrates an embodiment of a cross section of the 3D objects printed on the adhesive 103 on the print plate 101. The adhesive 103 can spread over the print plate 101. The adhesive 103 can contact and hold the permeable material 643 in place on the print plate 101. In some embodiments, a fan in the 3D printer or an external fan can direct ambient air in a downward direction to further hold the permeable material 643 to the print plate 101. The construction of the printed objects can include a heat seal layer 640 printed on a permeable material 643. The heat seal layer 640 material can flow through the pores or holes in the permeable material 643 between the print plate 101 and the permeable material 643 and surround portions of the permeable material 643. In an embodiment, the heat seal layer 640 can be made of polyurethane. In other embodiments, the heat seal layer 640 can be formulated from one or more materials including: polyurethane, nylon, polyester, polyolefin, vinyl and other suitable materials. The heat seal layer 640 can be between about 50 to 300 microns thick.

Additional build layers 647 can be printed over the heat seal layer(s) 640 to complete the printed objects on the permeable material 643. The build layers 647 can be made of a thermoplastic material that is different than the heat seal layers 640. For example, in different embodiments, the build layers can be made of: polylactic acid (PLA), acrylonitrile butadiene styrene (ABS) polymer, polyether ether ketone (PEEK), polyaryletherketone (PAEK), polytetrafluoroethylene (PTFE), polyurethane (PU) (NinjaFlex), Nylon and other thermoplastic materials or combinations of these materials. The build layers can be any thickness that is sufficient to complete the printing of the object.

Figure 22:
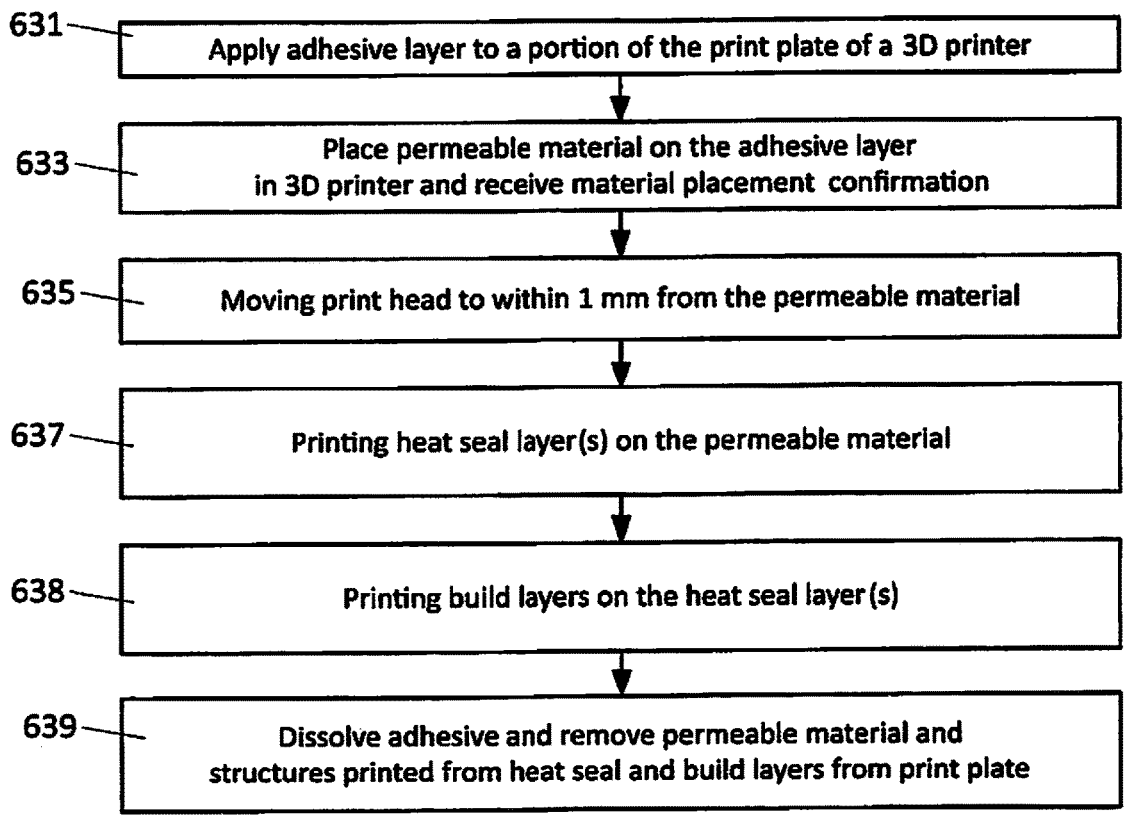
FIG. 22 illustrates an embodiment of a flow chart for creating a sandwich construction object bonded to a permeable material.

FIG. 22 illustrates an embodiment of flow chart with process steps for printing objects onto permeable materials in a sandwich construction with improved bonding between a permeable material and the 3D printed object. At step 631, an adhesive material is applied to the print plate. At step 633, the print plate and adhesive layer are placed in a 3D printer and at step 635 the print head of the 3D printer is moved within 1 centimeter or less (such as 1 millimeter) of the adhesive layer on the print plate. At step 637, the 3D printer prints a first heat seal layer(s) which is at least one layer thick on the print plate as shown in FIG. 21. At step 638, after the first heat seal layer(s) is printed, build layers can be deposited by a print head on the first heat seal layer(s) in the 3D printer. The build layers are deposited until the objects are completely printed. At step 639, the adhesive is dissolved and the permeable material and structures printed from the heat seal and build layers is removed from the print plate. Any post printing processing steps can then be performed.

FIG. 23 illustrates an embodiment of a cross section of the 3D objects printed on the adhesive 103 on the print plate 101. The construction includes a first heat seal layer 641 and a second heat seal layer 645 that are sandwiched around portions of the permeable material 643. The first heat seal layer 641 and second heat seal layer 645 can fuse together through the pores or holes in the permeable material 643. The first heat seal layer 641 and the second heat seal layer 645 can be formulated from one or more of: polyurethane, nylon, polyester, polyolefin, vinyl and other suitable materials. After the first heat seal layer 641 is printed on the print plate 101, additional adhesives can be placed around the first heat seal layer 641 and the permeable material 643 can be secured to the print plate 101. In some embodiments, a fan in the 3D printer or a fan can direct ambient air in a downward direction to further hold the permeable material 643 to the print plate 101. The second heat seal layer 645 can be printed on the permeable material 643 over the first heat seal layer 641. Additional build layers 647 can be printed over the second heat seal layer 645 to complete the printed objects on the permeable material 643. The build layers 647 can be made of a thermoplastic material that is different than the heat seal layers 641, 645. For example, in different embodiments, the build layers 647 can be made of: polylactic acid (PLA), acrylonitrile butadiene styrene (ABS) polymer, polyether ether ketone (PEEK), polyaryletherketone (PAEK), polytetrafluoroethylene (PTFE), polyurethane (PU), NinjaFlex, Nylon and other thermoplastic materials or combinations of these materials.

FIG. 24 illustrates an embodiment of a flow chart with process steps for printing objects onto permeable materials in a sandwich construction with improved bonding between a permeable material and the 3D printed object. At step 651, an adhesive material is applied to the print plate. At step 653, the print plate and adhesive layer are placed in a 3D printer and the print head of the 3D printer is moved within 1 centimeter or less (such as within 1 millimeter) of the adhesive layer on the print plate. At step 655, the 3D printer prints a first heat seal layer(s) which is at least one layer thick on the print plate as shown in FIG. 21. At step 657, after the first heat seal layer(s) is printed the print head is separated from the print plate so that there is sufficient space for the permeable material to be inserted on the first heat seal layer(s) in the 3D printer. At step 659, additional adhesive is placed on the print plate around the first heat seal layer(s) but not in contact with the first heat seal layer(s).

At step 661, the permeable material is placed on the first heat seal layer(s) in the 3D printer. The permeable material surrounding the first heat seal layer(s) can be held to the print plate by the adhesive applied to the print plate at step 649. In some embodiments, a fan in the 3D printer or a fan can direct ambient air in a downward direction to further hold and secure the permeable material 643 to the print plate 101 during material printing. The 3D printer operator may press a confirmation button to inform the printer that the permeable material is in place and the distance between the print head and the permeable material can be decreased. At step 663 the print head of the 3D printer is moved within 1 centimeter or less such as 1 millimeter of the permeable material. At step 665 the 3D printer prints a second heat seal layer directly on the first heat seal layer. The second heat seal layer can be printed at modified printer settings which can have a higher material output temperature. The higher temperature can cause the second heat seal layer material to flow through the permeable material and bond to the first heat seal material. At step 667, print additional build layers are printed on the second heat seal layer(s) to complete the 3D object. At step 669 remove print plate from the 3D printer and use water to dissolve the adhesive and then remove the permeable material and printed object from the print plate as previously described above with reference to FIG. 16.

In different embodiments, the three dimensional printer used to bond objects to the permeable material can have settings which can be controlled to optimize the bonding of the printed thermoplastics onto the permeable materials. In an embodiment the three dimensional printer used for this application can be a "plastic jet print" (PJP) or a "fused filament fabrication" (FFF) type three dimensional printer. A STL the is created from a 3D CAD model for the desired objects to be printed onto the porous material. The STL file is an industry-standard file extension that "slices" the 3D object design into a stack of cross-sections. These cross-sections are then used to print the object. As discussed, the lower first layer(s) of the object can be heat seal layers that are made of a first thermoplastic material for bonding the printed objects directly to the porous material using a heat seal material filament in the RIP or FFF printer. Upper build layers can be printed on and fused to the heat seal layer(s) with a build layer filament that is a different material than the heat seal material filament. During the printing process, the print head and the print plate of the printer can start a heating process, which may last about 10 minutes. Once the preset temperatures are reached, printing of the object can begin. The raw thermoplastic material in the form of a thin plastic heat seal or build material filaments are fed through the heated print tip of the PJP or FT F printers. The print tip melts the filament and "draws" with it a cross-section of the object on the porous material or print plate as described above.

In different embodiments, the three dimensional printer used to bond objects to the permeable material can have settings which can be controlled to optimize the bonding of the printed heat seal layer thermoplastics to the permeable materials. The print temperature of the heat seal material will vary with the melt temperature of the material. However, adjusting the print temperature from the normal print temperature can affect the viscosity with a higher print temperature creating a lower viscosity thermoplastic and a lower print temperature producing a higher viscosity thermoplastic. A lower viscosity material may produce better adhesion for thicker porous materials where the thermoplastic must flow a longer distances for proper bonding. In contrast, a thinner material that is less absorptive may produce better results with a lower temperature and lower viscosity print material. The volume of the heat seal layer material output by the three dimensional printer can also depend upon the thickness and porosity of the permeable material. A lower density, highly porous and thick material may require more heat seal material volume and a thin material with only small pores may require less print material than a thick permeable material with many pores.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

What is claimed is:

1. A method for printing a three-dimensional object onto a permeable material sheet, comprising:
   printing by the three-dimensional printer, an under structure on a print plate;
   placing the permeable material sheet over the under structure on the print plate;
   printing by the three-dimensional printer, a bonding layer onto the permeable material, wherein portions of the bonding layer flows through the permeable material;
   fusing the bonding layer with the under structure; and
   printing by the three-dimensional printer, a plurality of build layers onto the bonding layer to create the three-dimensional object.

2. The method of claim 1, wherein a first output temperature of the three-dimensional printer during the printing of the bonding layer is at least 10 degrees Centigrade higher than a second output temperature of the three-dimensional printer during the printing of the plurality of build layers.

3. The method of claim 1, wherein the permeable material has a plurality of holes and the portions of the bonding layer flow through the plurality of holes in the permeable material sheet and fuse with the under structure.

4. The method of claim 1, wherein the permeable material sheet is a woven fabric.

5. The method of claim 1, wherein the understructure, the bonding layer, and the build layers are formed from a thermoplastic material.

6. The method of claim 1, further comprising:
   storing a three-dimensional pattern for printing the plurality of build layers in a memory device; and transmitting the three-dimensional pattern for printing the plurality of build layers from the memory device to the three-dimensional printer.

7. A method for printing a three-dimensional object onto a permeable material sheet, comprising:
   printing by the three-dimensional printer, an under structure of a thermoplastic material onto a print plate by moving a nozzle of a 3D printer in a horizontal X-Y plane;
   placing the permeable material sheet over the under structure on the print plate;
   printing by the three-dimensional printer, a bonding layer of the thermoplastic material onto an area of the permeable material sheet, wherein portions of the bonding layer flows through the permeable material and is fused to the under structure; and
   printing by the three-dimensional printer, a build layer of the thermoplastic material for the three-dimensional pattern directly onto the bonding layer.

8. The method of claim 7, wherein a first output temperature of the three-dimensional printer during the printing of the bonding layer is at least 10 degrees Centigrade higher than a second output temperature of the three-dimensional printer during the printing of the plurality of build layers.

9. The method of claim 7, wherein the permeable material has a plurality of holes and the portions of the bonding layer flow through the plurality of holes in the permeable material sheet and fuse with the under structure.

10. The method of claim 7, wherein the permeable material sheet is a woven fabric.

11. The method of claim 7, wherein the understructure, the bonding layer, and the build layers are formed from polylactic acid (PLA).

12. The method of claim 7, further comprising:
   storing a three-dimensional pattern for printing the plurality of build layers in a memory device; and
   transmitting the three-dimensional pattern for printing the plurality of build layers from the memory device to the three-dimensional printer.

13. A method for printing a plurality of three-dimensional objects onto a permeable material sheet, comprising:
   A) printing by the three-dimensional printer, a plurality of under structure onto a print plate;
   B) placing the permeable material sheet over the plurality of under structures on the print plate;
   C) printing by the three-dimensional printer, a bonding layer onto the permeable material, wherein portions of the bonding layer flows through the permeable material;
   D) fusing the bonding layer with one of the plurality of under structures; and
   E) printing by the three-dimensional printer, a plurality of build layers onto the bonding layer to create a three-dimensional object.
   F) repeating steps C-E to create the plurality of three-dimensional objects on the permeable material.

14. The method of claim 13, wherein a first output temperature of the three-dimensional printer during the printing of the bonding layer is at least 10 degrees Centigrade higher than a second output temperature of the three-dimensional printer during the printing of the plurality of build layers.

15. The method of claim 13, wherein the thermoplastic material is polylactic acid (PLA) and the first output temperature of the three-dimensional printer during the printing of the bonding layer is greater than 250 degrees Centigrade and the second output temperature of the three-dimensional printer during the printing of the plurality of build layers is less than 250 degrees Centigrade.

16. The method of claim 13, wherein the printing of the bonding layer is performed at a first material output rate and the printing of the build layer is performed at a second material output rate that is at least 5% slower than the first material output rate.

17. The method of claim 13, wherein the permeable material has a plurality of holes and the portions of the bonding layer flow through the plurality of holes in the permeable material sheet and fuse with the under structure.

18. The method of claim 13, wherein the permeable material sheet is a woven fabric.

19. The method of claim 13, wherein the understructure, the bonding layer, and the build layers are formed from a thermoplastic material.

20. The method of claim 13, further comprising:
   storing a three-dimensional pattern for printing the plurality of build layers in a memory device; and
   transmitting the three-dimensional pattern for printing the plurality of build layers from the memory device to the three-dimensional printer.

* * * * *